US011954538B2

(12) United States Patent
Belio et al.

(10) Patent No.: US 11,954,538 B2
(45) Date of Patent: Apr. 9, 2024

(54) UPDATING A STATE OF A CLIENT DEVICE USING A LIMITED EVENT SIZE PROTOCOL

(71) Applicant: Microsoft Technology Licensing, LLC, Redmond, WA (US)

(72) Inventors: Roy Belio, Netanya (IL); Lior Menachem Schachter, Tel Aviv (IL); Alon Catz, Tel Aviv (IL)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/825,373

(22) Filed: May 26, 2022

(65) Prior Publication Data

US 2023/0385130 A1 Nov. 30, 2023

(51) Int. Cl.
*G06F 9/44* (2018.01)
*G06F 9/54* (2006.01)
*G06F 16/23* (2019.01)

(52) U.S. Cl.
CPC .............. *G06F 9/542* (2013.01); *G06F 16/23* (2019.01)

(58) Field of Classification Search
CPC ...................................... G06F 9/542
USPC ....................................... 719/318
See application file for complete search history.

(56) References Cited

U.S. PATENT DOCUMENTS

2002/0161789 A1* 10/2002 Schaefer ............. G06F 11/1666
707/999.203

OTHER PUBLICATIONS

Marshall, Don, "Event Tracing for Windows (ETW)", Retrieved Date: https://docs.microsoft.com/en-us/windows-hardware/drivers/devtest/event-tracing-for-windows--etw-?msclkid=599e6e78b20111ecac068a862e9b14cf, Dec. 15, 2021, 2 Pages.
"Event Tracing for Windows (ETW) Simplified", Retrieved From: https://support.microsoft.com/en-us/topic/05246263-57f5-3a30-6f5a-7f8ccf2236b0?msclkid=599ecfbfb20111eca8371009c297697d, Mar. 16, 2022, 5 Pages.
"Maximum transmission unit", Retrieved from: https://en.wikipedia.org/w/index.php?title=Maximum_transmission_unit&oldid=1088821485, May 20, 2022, 7 Pages.
"International Search Report and Written Opinion Issued in PCT Application No. PCT/US23/020092", dated Jul. 31, 2023, 13 Pages.

* cited by examiner

*Primary Examiner* — Timothy A Mudrick
(74) *Attorney, Agent, or Firm* — Wade IP Law PLLC

(57) ABSTRACT

Techniques are described herein that are capable of updating a state of a client device using a limited event size protocol. An initial state of the client device is stored. The initial state is defined by first records that identify first respective binaries associated with the client device at a first time. A first event of multiple events, which are configured in accordance with the limited event size protocol, is received from the client device. Each event includes a respective subset of second records, which identify respective second binaries associated with the client device at a second time. The first event is parsed to identify a first subset of the second records that is included in the first event. An updated state of the client device is generated by replacing a first portion of the first records with the first subset of the second records.

20 Claims, 7 Drawing Sheets

UPDATING A STATE OF A CLIENT DEVICE USING A LIMITED EVENT SIZE PROTOCOL

BACKGROUND

Client devices often inform a server of their state, for example, to assist the server in performing administrative duties with regard to the client devices. A popular conventional technique for providing such state involves a client device generating an event for each software product that is stored on the client device. Each event includes information about the respective software product. The client device sends the events to the server and thereafter sends an index event (a.k.a. checkpoint message) that includes the names of the respective software products. The server traditionally stores the events and does not begin processing the events until the index event is received by the server. Upon receipt of the index event, the server processes the events to determine a current state of the client device and then overwrites a previously stored state of the client device with the current state of the client device in memory of the server.

Delaying the processing of the events until the index event is received by the server delays updating the state of the client device in the memory of the server. If the server does not receive the index event, the server traditionally deletes the events without processing the events. If an event indicates that information about a software product is to be deleted from the state, the information traditionally cannot be deleted unless the index event does not include a name of the software product. In the conventional technique, the utilization of each event is relatively low because each event includes data about a single product. An amount of metadata associated with each event may not be substantially affected by the amount of data that is included in the event. Accordingly, in the conventional technique, the amount of metadata associated with each event may be relatively high relative to the amount of data in the event.

SUMMARY

Various approaches are described herein for, among other things, updating a state of a client device using a limited event size protocol. Examples of a client device include but are not limited to a user device, an Internet of things (IoT) device, and an unmanned device (e.g., an autonomous vehicle). A limited event size protocol is a protocol in which a size of an event is not allowed to be greater than a threshold event size. For instance, the size of each event may be variable (i.e., not fixed) so long as the size of the respective event does not exceed the event size threshold. The threshold event size may be a fixed size, such as 64 kilobytes (kB) or 128 kB. An event indicates an action or an occurrence. For instance, the event may indicate one or more binaries that are stored on a client device. The event may include data and metadata. For example, the data may include information about (e.g., describing) the one or more binaries. The metadata may indicate a type of the event, a time instance at which the event was initiated, an entity that caused the event to be initiated, and/or a manner in which the event is to be processed. Records may be used to represent respective binaries that are stored on a client device. For instance, each record may include the binary that the record represents and/or a cryptographic key that identifies the binary. Each cryptographic key may be an encoded representation (e.g., a hash) of the respective binary. For example, each cryptographic key may be generated by an implementor function, such as a hashing function. The records may be distributed among multiple events to indicate the state of the client device. The events may be parsed by a computing system to determine the state of the client device.

In a first example approach, an initial state of a client device is stored. The initial state is defined by first records that identify first respective binaries that are associated with the client device at a first time instance. A first event of multiple events is received from the client device. Each of the events, except for the last event, includes a respective subset of second records and a beginning record of a next sequential event of the events. The last event includes a respective subset of the second records. The second records identify respective second binaries that are associated with the client device at a second time instance that temporally follows the first time instance. The second records may be referred to as respective partially ordered records. Partially ordered records are records having a partial order such that, for at least one pair of the records, a first record of the pair precedes a second record of the pair. Accordingly, each of the subsets of the second records may be referred to as a partial order subset, and each of the events may be referred to as a partial order event. A number of second records in each subset of the second records is based on an event size threshold. The event size threshold is greater than a size of a single one of the second records and less than a cumulative size of the second records. The first event is parsed to identify a first subset of the second records that is included in the first event. An updated state of the client device is generated by replacing a first portion of the first records, which corresponds to the first subset of the second records, with the first subset of the second records.

In a second example approach, an initial state of a client device is stored. The initial state is defined by first records that identify respective first binaries that are associated with the client device at a first time instance. Events are received from the client device at respective time instances. The events include respective subsets of the second records. The second records identify respective second binaries that are associated with the client device at a second time instance that temporally follows the first time instance. A number of second records in each subset of the second records is based on an event size threshold. The event size threshold is greater than a size of a single one of the second records and less than a cumulative size of the second records. Based on receipt of each of the events, first and second actions are performed. The first action includes parsing the respective event to identify the respective subset of the second records that is included in the respective event. The second action includes triggering a respective incremental update of the state of the client device without regard to whether another of the events has been received from the client device. Triggering the respective incremental update includes replacing a respective portion of the first records, which corresponds to the respective subset of the second records, with the respective subset of the second records.

This Summary is provided to introduce a selection of concepts in a simplified form that are further described below in the Detailed Description. This Summary is not intended to identify record features or essential features of the claimed subject matter, nor is it intended to be used to limit the scope of the claimed subject matter. Moreover, it is noted that the invention is not limited to the specific embodiments described in the Detailed Description and/or other sections of this document. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form part of the specification, illustrate embodiments of the present invention and, together with the description, further serve to explain the principles involved and to enable a person skilled in the relevant art(s) to make and use the disclosed technologies.

Figure 1:
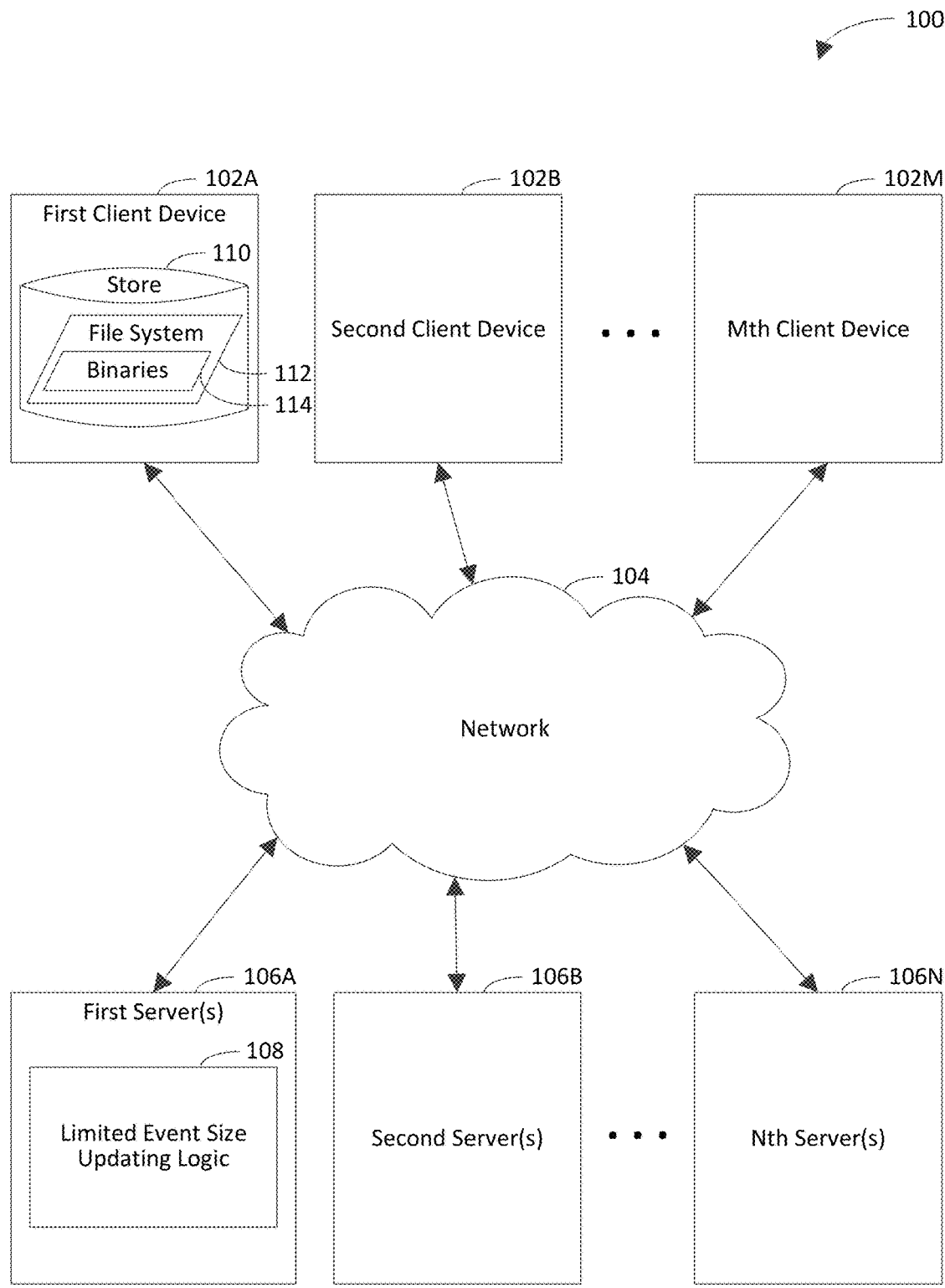
FIG. 1 is a block diagram of an example limited event size updating system in accordance with an embodiment.

The features and advantages of the disclosed technologies will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The following detailed description refers to the accompanying drawings that illustrate exemplary embodiments of the present invention. However, the scope of the present invention is not limited to these embodiments, but is instead defined by the appended claims. Thus, embodiments beyond those shown in the accompanying drawings, such as modified versions of the illustrated embodiments, may nevertheless be encompassed by the present invention.

References in the specification to "one embodiment," "an embodiment," "an example embodiment," or the like, indicate that the embodiment described may include a particular feature, structure, or characteristic, but every embodiment may not necessarily include the particular feature, structure, or characteristic. Moreover, such phrases are not necessarily referring to the same embodiment. Furthermore, when a particular feature, structure, or characteristic is described in connection with an embodiment, it is submitted that it is within the knowledge of one skilled in the relevant art(s) to implement such feature, structure, or characteristic in connection with other embodiments whether or not explicitly described.

Descriptors such as "first", "second", "third", etc. are used to reference some elements discussed herein. Such descriptors are used to facilitate the discussion of the example embodiments and do not indicate a required order of the referenced elements, unless an affirmative statement is made herein that such an order is required.

II. Example Embodiments

Example embodiments described herein are capable of updating a state of a client device using a limited event size protocol. Examples of a client device include but are not limited to a user device, an Internet of things (IoT) device, and an unmanned device (e.g., an autonomous vehicle). A limited event size protocol is a protocol in which a size of an event is not allowed to be greater than a threshold event size. For instance, the size of each event may be variable so long as the size of the respective event does not exceed the event size threshold. The threshold event size may be a fixed size, such as 64 kilobytes (kB) or 128 kB. An event indicates an action or an occurrence. For instance, the event may indicate one or more binaries that are stored on a client device. The event may include data and metadata. For example, the data may include information about (e.g., describing) the one or more binaries. The metadata may indicate a type of the event, a time instance at which the event was initiated, an entity that caused the event to be initiated, and/or a manner in which the event is to be processed. Records may be used to represent respective binaries that are stored on a client device. For instance, each record may include the binary that the record represents and/or a cryptographic key that identifies the binary. Each cryptographic key may be an encoded representation (e.g., a hash) of the respective binary. For example, each cryptographic key may be generated by an implementor function, such as a hashing function. The records may be distributed among multiple events to indicate the state of the client device. The events may be parsed by a computing system to determine the state of the client device.

Example techniques described herein have a variety of benefits as compared to conventional techniques for updating a state of a client device. For instance, the example techniques may be capable of updating each of multiple portions of a state of a client device without delay based on receipt of the event corresponding to the respective portion. For example, each event may be processed without waiting on receipt of the other events that correspond to the state of the client device. Accordingly, the state of the client device may be incrementally updated as the events are received. For instance, the state of the client device may be split into batches that are defined by the events, and each record may comply with a non-strict partial order. A non-strict partial order is a homogeneous relation on the records that is reflexive, antisymmetric, and transitive. The relation being reflexive means that each of the records is related to itself. The relation being antisymmetric means that no two distinct records precede each other. The relation being transitive means that if the relation relates A to B and B to C, then the relation also relates A to C. The events may be received at a server in a reliable, atomized, and optimized manner, which may enable a complete replica of the state of the client device to be stored by the server. Each of the events may be stateless, meaning that each event is agnostic (i.e., independent) with regard to the other events both on the client device and on the server. If an event is not received by the server, information in the event may be excluded from the update to the state without affecting the rest of the update (i.e., without causing information in other events to be excluded from the update).

Because a successful update of the state is not dependent on receipt of an index event, the example techniques may be more reliable than the conventional techniques. For instance, the records that define the state need not necessarily be deleted as a consequence of an index event not being received, and the events are still capable of being processed in absence of such an index event. If an event does not include a record, the record may be deleted from an update of the state without waiting to determine whether an index event identifies the record (or a binary associated with the record). In the example techniques, the utilization of the events is relatively high because the events include a greater ratio of data to metadata, as compared to the conventional techniques.

The example techniques may reduce an amount of time and/or resources (e.g., processor cycles, memory, network bandwidth) that is consumed to update a state of a client device. For example, by filling each event with records up to an event size threshold in accordance with a limited event size protocol, a number of events that are processed to identify the records therein may be reduced, thereby reducing the amount of time and/or resources that is consumed. In another example, by configuring an event to include a beginning record of a next sequential event, a number of operations that are performed to place the records in order may be reduced, thereby reducing the amount of time and/or resources that is consumed. In yet another example, the amount of time that is consumed to update the state of the client device may be reduced by triggering incremental updates of the state, rather than delaying an update of the state until an index event is received. By using the limited event size protocol to process each event as it is received (e.g., without waiting for receipt of an index event), the efficiency of a computing system that is used to update the state of the client device may be increased. By increasing a ratio of data to metadata in each event, the efficiency of the computing system may be increased.

FIG. 1 is a block diagram of an example limited event size updating system 100 in accordance with an embodiment. Generally speaking, the limited event size updating system 100 operates to provide information to users in response to requests (e.g., hypertext transfer protocol (HTTP) requests) that are received from the users. The information may include documents (Web pages, images, audio files, video files, etc.), output of executables, and/or any other suitable type of information. In accordance with example embodiments described herein, the limited event size updating system 100 updates a state of a client device 102A using a limited event size protocol. Detail regarding techniques for updating a state of a client device using a limited event size protocol is provided in the following discussion.

As shown in FIG. 1, the limited event size updating system 100 includes a plurality of client devices 102A-102M, a network 104, and a plurality of servers 106A-106N. Communication among the client devices 102A-102M and the servers 106A-106N is carried out over the network 104 using well-known network communication protocols. The network 104 may be a wide-area network (e.g., the Internet), a local area network (LAN), another type of network, or a combination thereof.

The client devices 102A-102M are processing systems that are capable of communicating with servers 106A-106N. An example of a processing system is a system that includes at least one processor that is capable of manipulating data in accordance with a set of instructions. For instance, a processing system may be a computer, a personal digital assistant, etc. The client devices 102A-102M are configured to provide requests to the servers 106A-106N for requesting information stored on (or otherwise accessible via) the servers 106A-106N. For instance, a user may initiate a request for executing a computer program (e.g., an application) using a client (e.g., a Web browser, Web crawler, or other type of client) deployed on a client device 102 that is owned by or otherwise accessible to the user. In accordance with some example embodiments, the client devices 102A-102M are capable of accessing domains (e.g., Web sites) hosted by the servers 104A-104N, so that the client devices 102A-102M may access information that is available via the domains. Such domain may include Web pages, which may be provided as hypertext markup language (HTML) documents and objects (e.g., files) that are linked therein, for example.

Each of the client devices 102A-102M may include any client-enabled system or device, including but not limited to a desktop computer, a laptop computer, a tablet computer, a wearable computer such as a smart watch or a head-mounted computer, a personal digital assistant, a cellular telephone, an Internet of things (IoT) device, an unmanned device such as an autonomous vehicle, or the like. It will be recognized that any one or more of the client devices 102A-102M may communicate with any one or more of the servers 106A-106N.

The first client device 102A is shown to include a store 110. The store 110 may be any suitable type of store. One type of store is a database. For instance, the store 110 may be a relational database, an entity-relationship database, an object database, an object relational database, an extensible markup language (XML) database, etc. The store 110 is shown to store a file system 112, which includes binaries (a.k.a. binary files) 114, for non-limiting, illustrative purposes. A file system is a data structure that groups data into files (a.k.a. computer files) for storage and retrieval. The file system 112 may include a master file table, which includes the binaries, though the example embodiments are not limited in this respect. A binary file is a computer file that is not a text file, which means that the binary file includes portion(s) (e.g., bytes) that are configured to be interpreted as something other than text character(s). It will be recognized that a binary file may include portions that are configured to be interpreted as text characters, so long as the binary file includes at least one portion that is configured to be interpreted as something other than a text character. Examples of a binary file include but are not limited to an executable file, a job file (e.g., a Java archive file), and an Apple disk image file. For instance, each of the binaries 114 may be associated with a respective software program that is stored in the store 110.

The first client device 102A generates records to represent the respective binaries 114. For instance, records may include the respective binaries 114 and/or cryptographic keys that identify the respective binaries 114. The cryptographic keys may be encoded representations (e.g., hashes) of the respective binaries 114. The first client device 102A generates events to include respective subsets of the records. The first client device 102A configures the events in accordance with a limited event size protocol. In an example, the number of records in each event is based on an event size threshold. In accordance with this example, the event size threshold is greater than a size of a single record and less than a cumulative size of the records. The first client device 102A provides the events to the first server(s) 106A for processing.

The first client device 102A may generate and provide events in this manner each time the state of the first client device 102A is to be updated on the first server(s) 106A. For instance, the first client device 102A may provide first events that include respective subsets of first records, which identify respective binaries associated with (e.g., stored on) the first client device 102A at a first time instance. The first client device 102A subsequently may provide second events that include respective subsets of second records, which identify respective binaries associated with the first client device 102A at a second time instance, and so on.

The servers 106A-106N are processing systems that are capable of communicating with the client devices 102A-102M. The servers 106A-106N are configured to execute computer programs that provide information to users in response to receiving requests from the users. For example, the information may include documents (Web pages, images, audio files, video files, etc.), output of executables, or any other suitable type of information. One example type of computer program that may be executed by one or more of the servers 106A-106N is a cloud computing service. A cloud computing service is a service that executes at least in part in the cloud. The cloud may be a remote cloud, an on-premises cloud, or a hybrid cloud. It will be recognized that an on-premises cloud may use remote cloud services. Examples of a cloud computing service include but are not limited to Azure® developed and distributed by Microsoft Corporation, Google Cloud® developed and distributed by Google Inc., Oracle Cloud® developed and distributed by Oracle Corporation, Amazon Web Services® developed and distributed by Amazon.com, Inc., Salesforce® developed and distributed by Salesforce.com, Inc., and Rackspace® developed and distributed by Rackspace US, Inc. It will be recognized that the example techniques described herein may be implemented using a cloud computing service. In accordance with some example embodiments, the servers 106A-106N are configured to host respective Web sites, so that the Web sites are accessible to users of the limited event size updating system 100.

The first server(s) 106A are shown to include limited event size updating logic 108 for illustrative purposes. The limited event size updating logic 108 is configured to update the state of the first client device 102A using the limited event size protocol. In a first example implementation, the limited event size updating logic 108 stores an initial state of the first client device 102A. The initial state is defined by first records that identify first respective binaries that are associated with the first client device 102A at a first time instance. The limited event size updating logic 108 receives a first event of multiple events from the first client device 102A. Each of the events, except for the last event, includes a respective subset of second records and a beginning record of a next sequential event of the events. The last event includes a respective subset of the second records. The second records identify respective second binaries that are associated with the first client device 102A at a second time instance that temporally follows the first time instance. A number of second records in each subset of the second records is based on an event size threshold. The event size threshold is greater than a size of a single one of the second records and less than a cumulative size of the second records. The limited event size updating logic 108 parses the first event to identify a first subset of the second records that is included in the first event. The limited event size updating logic 108 generates an updated state of the first client device 102A by replacing a first portion of the first records, which corresponds to the first subset of the second records, with the first subset of the second records.

In a second example implementation, the limited event size updating logic 108 stores an initial state of the first client device 102A. The initial state is defined by first records that identify respective first binaries that are associated with the first client device 102A at a first time instance. The limited event size updating logic 108 receives events from the first client device 102A at respective time instances. The events include respective subsets of the second records. The second records identify respective second binaries that are associated with the first client device 102A at a second time instance that temporally follows the first time instance. A number of second records in each subset of the second records is based on an event size threshold. The event size threshold is greater than a size of a single one of the second records and less than a cumulative size of the second records. The limited event size updating logic 108 performs first and second actions based on receipt of each of the events. The first action includes parsing the respective event to identify the respective subset of the second records that is included in the respective event. The second action includes triggering a respective incremental update of the state of the first client device 102A without regard to whether another of the events has been received from the first client device 102A. Triggering the respective incremental update includes replacing a respective portion of the first records, which corresponds to the respective subset of the second records, with the respective subset of the second records.

The limited event size updating logic 108 is described as being configured to update the state of the first client device 102A using the limited event size protocol for non-limiting, illustrative purposes. It will be recognized that the limited event size updating logic 108 may be configured to update the state of any one or more (e.g., all) of the client devices 102A-102M using the limited event size protocol. For instance, the limited event size updating logic 108 may update portions of the state of the client devices 102A-102M (e.g., in real-time) as the events corresponding to those portions are received at the first server(s) 106A or the limited event size updating logic 108 therein.

The limited event size updating logic 108 may be implemented in various ways to update a state of a client device using a limited event size protocol, including being implemented in hardware, software, firmware, or any combination thereof. For example, the limited event size updating logic 108 may be implemented as computer program code configured to be executed in one or more processors. In another example, at least a portion of the limited event size updating logic 108 may be implemented as hardware logic/electrical circuitry. For instance, at least a portion of the limited event size updating logic 108 may be implemented in a field-programmable gate array (FPGA), an application-specific integrated circuit (ASIC), an application-specific standard product (ASSP), a system-on-a-chip system (SoC), a complex programmable logic device (CPLD), etc. Each SoC may include an integrated circuit chip that includes one or more of a processor (a microcontroller, microprocessor, digital signal processor (DSP), etc.), memory, one or more communication interfaces, and/or further circuits and/or embedded firmware to perform its functions.

It will be recognized that the limited event size updating logic 108 may be (or may be included in) a cloud computing service, though the scope of the example embodiments is not limited in this respect.

The limited event size updating logic 108 is shown to be incorporated in the first server(s) 106A for illustrative purposes and is not intended to be limiting. It will be recognized that the limited event size updating logic 108 (or any portion(s) thereof) may be incorporated in any one or more of the client devices 102A-102M. For example, client-side aspects of the limited event size updating logic 108 may be incorporated in one or more of the client devices 102A-102M, and server-side aspects of limited event size updating logic 108 may be incorporated in the first server(s) 106A. In another example, the limited event size updating logic 108 may be distributed among the client devices 102A-102M. In yet another example, the limited event size updating logic 108 may be incorporated in a single one of the client devices 102A-102M. In another example, the limited event size updating logic 108 may be distributed among the server(s) 106A-106N. In still another example, the limited event size updating logic 108 may be incorporated in a single one of the servers 106A-106N.

Figure 2:
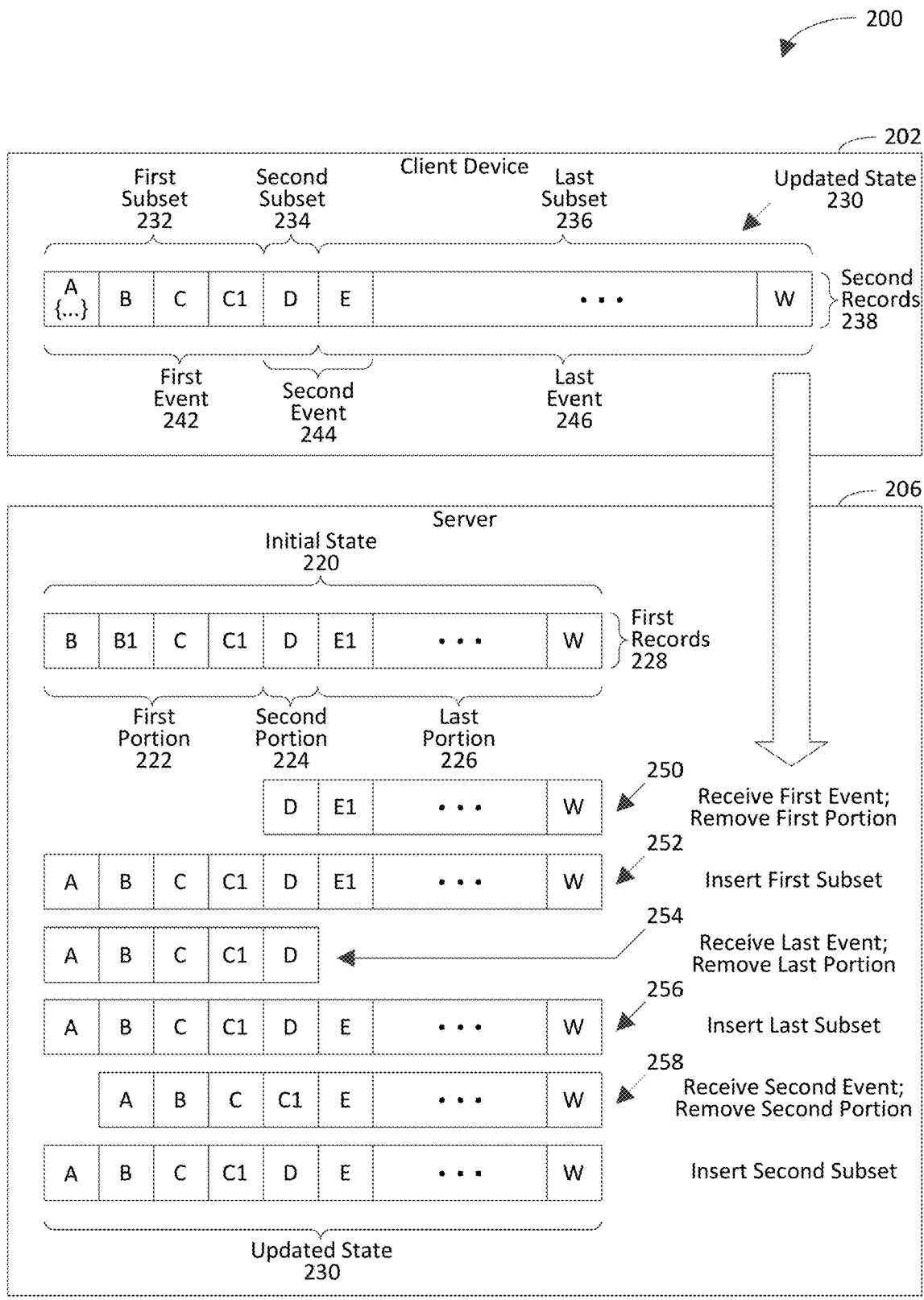
FIG. 2 depicts an example system in which a state of a client device is updated by a server in accordance with an embodiment.

FIG. 2 depicts an example system 200 in which a state of a client device 202 is updated by a server 206 in accordance with an embodiment. As shown in FIG. 2, the system 200 includes the client device 202 and the server 206. The server 206 stores an initial state 216 of the client device 202. The initial state 216 is defined by first records 228, which are labeled B, B1, C, C1, D, E1, . . . , and W. The client device 202 stores an updated state 218 of the client device 202. The updated state 218 is defined by second records 238, which are labeled A, B, C, C1, D, E, . . . , and W.

The client device 202 generates a first event 242, a second event 244, and a last event 246. The first event 242 includes a first subset 232 of the second records 238 and a beginning record, D, of the second event 244. The first subset 232 includes records A, B, C, and C1. The second event 244 includes a second subset 234 of the second records 238 and a beginning record, E, of the last event 246. The second subset 234 includes a single record, D. The last event 246 includes a last subset 236 of the second records 238. The last subset 236 includes records E, . . . , and W. The client device 202 provides the first event 242 to the server 206 at a first time instance, t1. The client device 202 provides the last event 246 to the server 206 at a second time instance, t2, which temporally follows the first time instance, t1. The client device 202 provides the second event 244 to the server 206 at a third time instance, t3, which temporally follows the second time instance, t2.

The server 206 receives the first event 242 at the first time instance, t1. The server 206 parses the first event 242 to determine that the first event 242 includes the first subset 232 of the second records 238 and record D. The server 206 determines that the first subset 232 of the second records 238 corresponds to a first portion 222 of the first records 228 based on the beginning record, A, of the first subset 232 of the second records 238 corresponding to the beginning record, B, of the first portion 222 of the first records 228 and further based on the record, D, from the first event 242 corresponding to the beginning record, D, of the second portion 224. Based on this determination, the server 206 removes the first portion 222 from the first records 228, resulting in a first intermediate state defined by a first intermediate set of records 250 (i.e., records D, E1, . . . , and W). The server 206 then prepends the first subset 232 of the second records 238 to the first intermediate set of records 250, resulting in a second intermediate state defined by a second intermediate set of records 252 (i.e., records A, B, C, C1, D, E1, . . . , and W).

The server 206 receives the last event 246 at the second time instance, t2. The server 206 parses the last event 246 to determine that the last event 246 includes the last subset 236 of the second records 238. The server 206 determines that the last subset 236 of the second records 238 corresponds to a last portion 226 of the first records 228 based on the beginning record, E, of the last subset 236 of the second records 238 corresponding to the beginning record, E1, of the last portion 226 of the first records 228. For instance, the server 206 may determine that the last subset 236 is to be ordered last among the subsets 232, 234, and 236 based on the last event 246 not including another record other than the last subset 236 of the second records 238. Based on the determination that the last subset 236 of the second records 238 corresponds to the last portion 226 of the first records 228, the server 206 removes the last portion 226 from the second intermediate set of records 252, resulting in a third intermediate state defined by a third intermediate set of records 254 (i.e., records A, B, C, C1, and D). For instance, the server 206 may remove records in a range from E1 through a highest Unicode value (i.e., u/FFFF) to ensure that all records in the range above record D are removed. The server 206 then appends the last subset 236 of the second records 238 to the third intermediate set of records 254, resulting in a fourth intermediate state defined by a fourth intermediate set of records 256 (i.e., records A, B, C, C1, D, E, . . . , and W).

The server 206 receives the second event 244 at the third time instance, t3.

The server 206 parses the second event 244 to determine that the second event 244 includes the second subset 234 of the second records 238 and record E. The server 206 determines that the second subset 234 of the second records 238 corresponds to a second portion 224 of the first records 228 based on the beginning record, D, of the second subset 234 of the second records 238 corresponding to the beginning record, D, of the second portion 224 of the first records 228 and further based on the record, E, from the second event 244 corresponding to the beginning record, E1, of the last portion 226. Based on this determination, the server 206 removes the second portion 224 from the fourth intermediate set of records 256, resulting in a fifth intermediate state defined by a fifth intermediate set of records 258 (i.e., records A, B, C, C1, E, . . . , and W). The server 206 then inserts the second subset 234 of the second records 238 among the fifth intermediate set of records 258, resulting in the updated state 230 of the client device 202, which is defined by the second records 238 (i.e., records A, B, C, C1, D, E, . . . , and W).

Accordingly, the server 206 therefore may be able to maintain a replica of the updated state 230 in an atomized and durable manner, out of order, and as up to date as possible. This technique may keep the events optimal and stateless and avoid the usage of an index event. The events need not necessarily be ordered or transmitted in a timely manner. For instance, transmission of any one or more of the events may be delayed without negatively impacting the updated state 230 that is stored by the server 206. In an example embodiment, if n is the size of the entire updated state 230 and k is the size of a subset of the second records 238 that is included in an event, then k<event size threshold <n. If the state of the client device, as stored on the server 206, is sorted (i.e., ordered), then a computational complexity of processing an event is O(log(N)+m), where N is a total number of records in the event, and m is a number of new records that are included in the event. If the state, as stored on the server 206, is unsorted (i.e., not ordered), then the computational complexity of processing an event is O(N+m).

Figure 3:
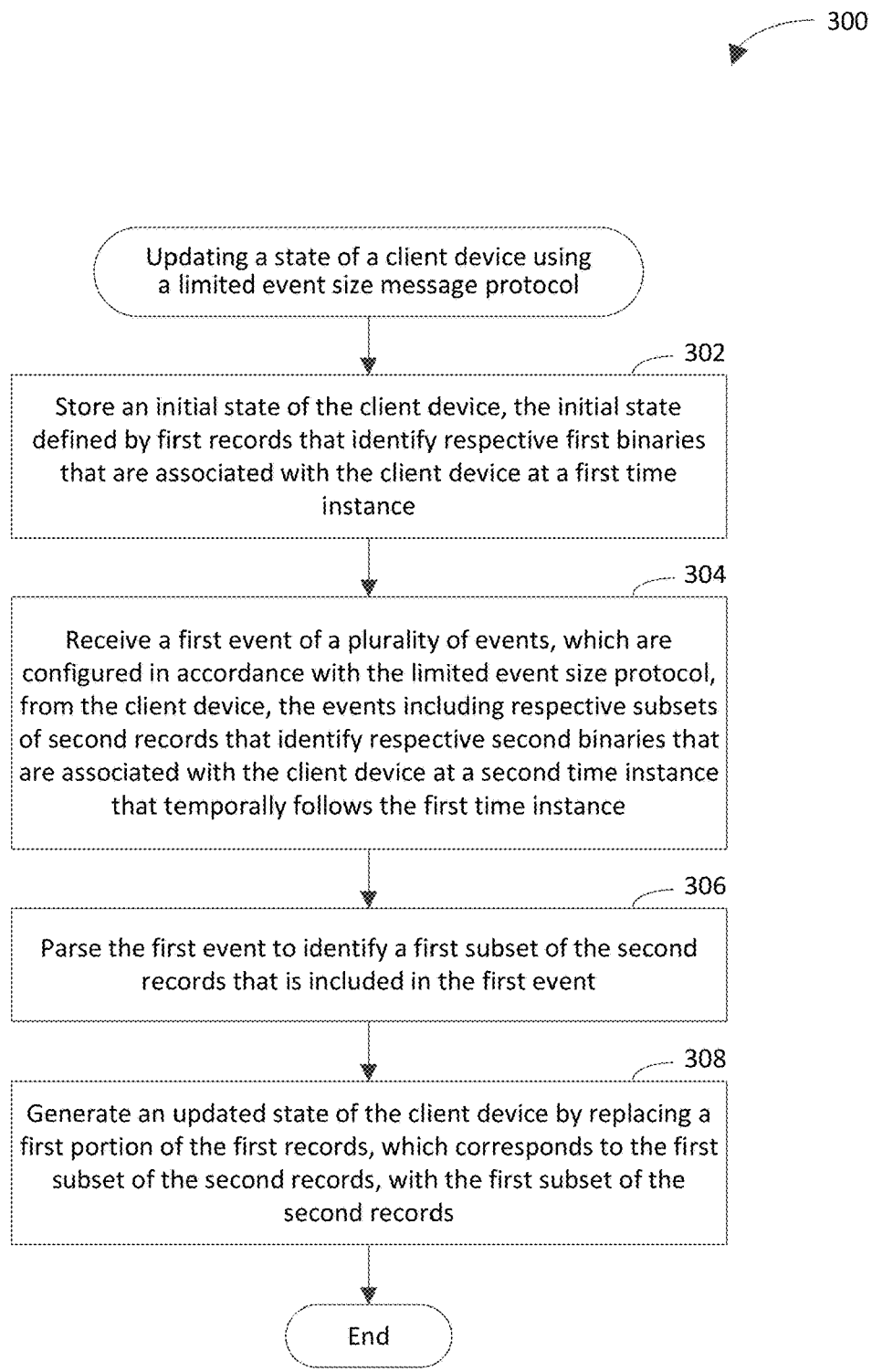
FIG. 3-5 depict flowcharts of example methods for updating a state of a client device using a limited event size protocol in accordance with embodiments.
Figure 4:
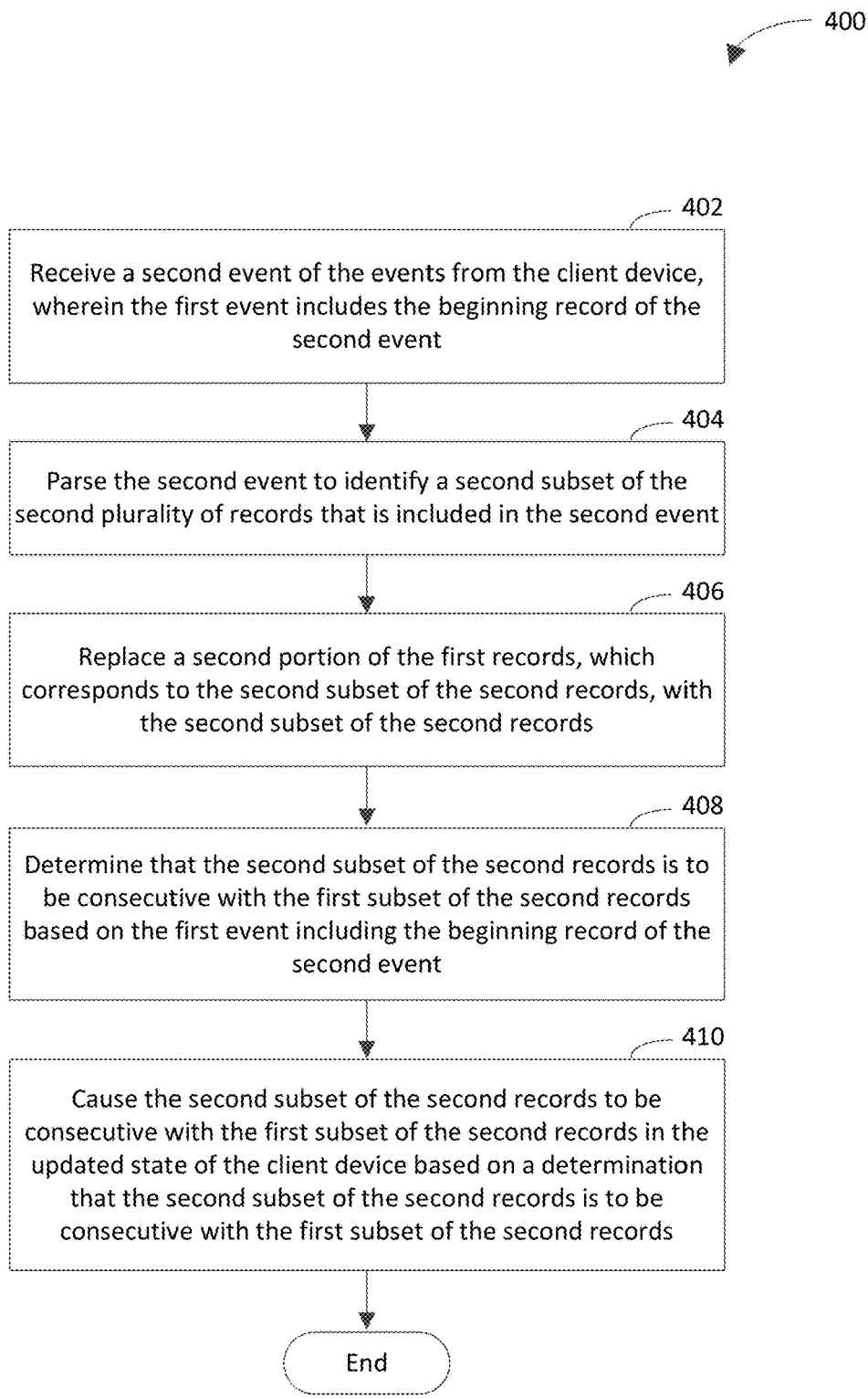
Figure 5:
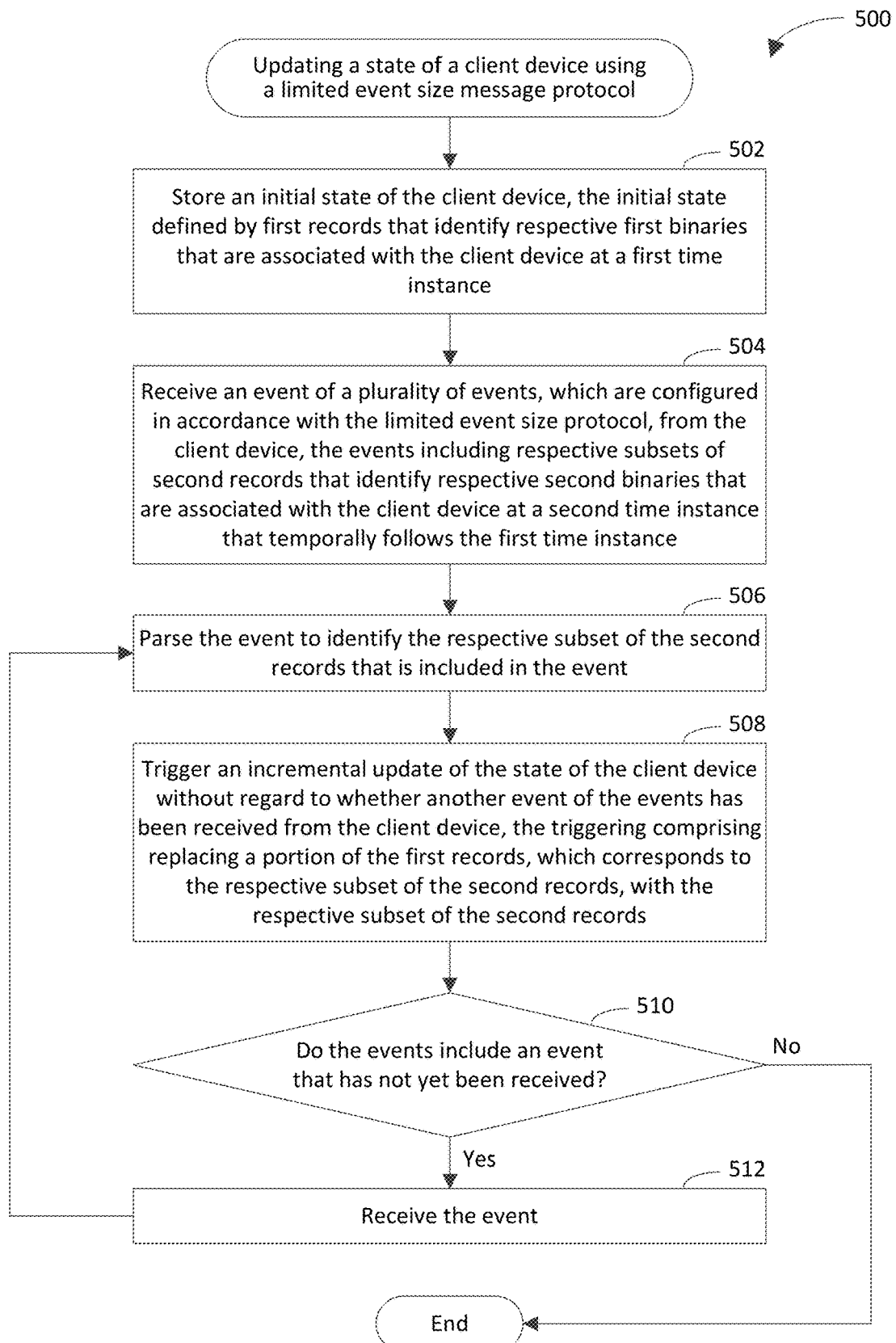
Figure 6:
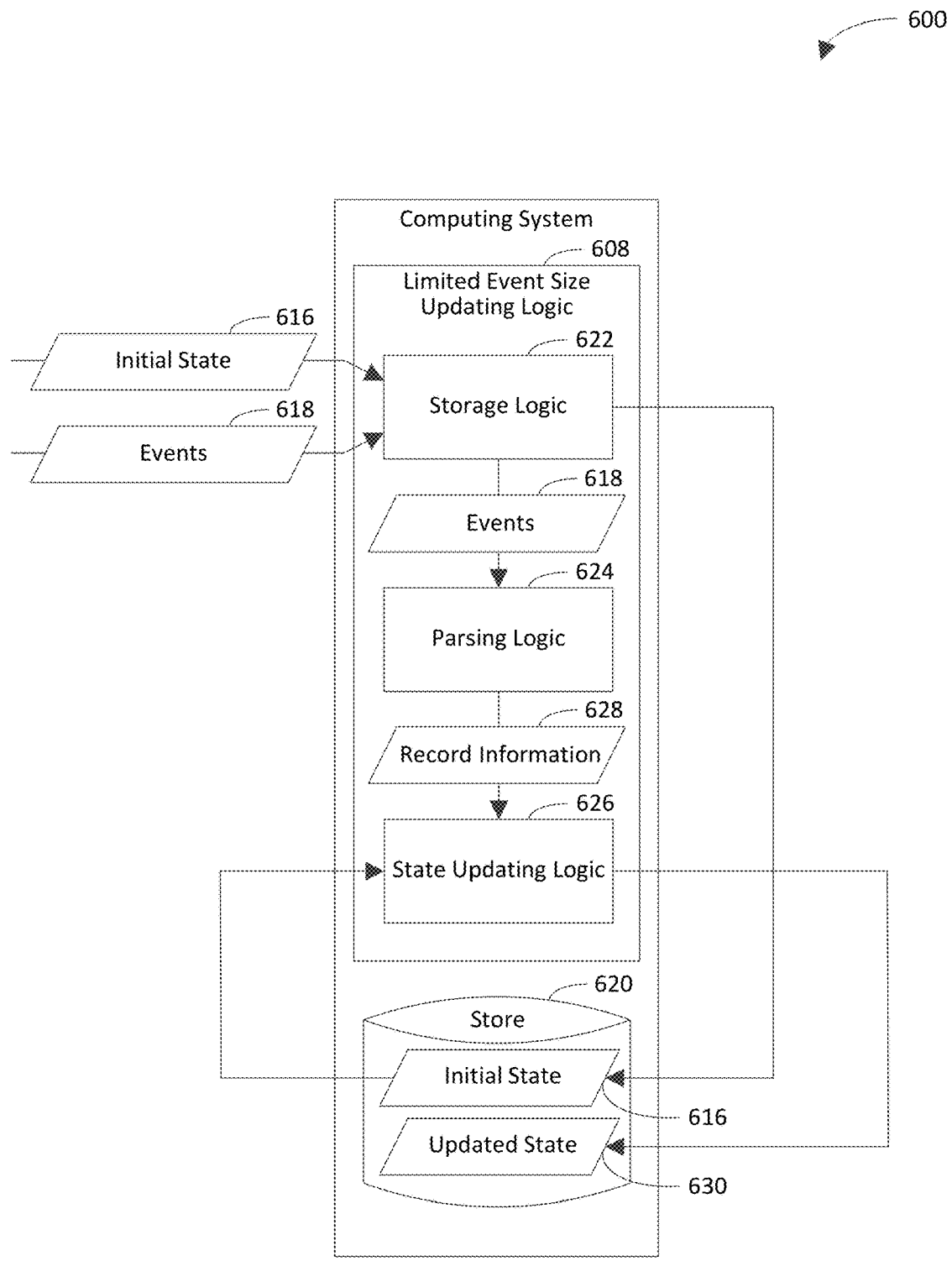
FIG. 6 is a block diagram of an example computing system in accordance with an embodiment.

FIG. 3-5 depict flowcharts 300, 400, and 500 of example methods for updating a state of a client device using a limited event size protocol in accordance with embodiments. Flowcharts 300, 400, and 500 may be performed by the first server(s) 106A shown in FIG. 1, for example. For illustrative purposes, flowcharts 300, 400, and 500 are described with respect to computing system 600 shown in FIG. 6, which is an example implementation of the first server(s) 106A. As shown in FIG. 6, the computing system 600 includes limited event size updating logic 608 and a store 620. The limited event size updating logic 608 includes storage logic 622, parsing logic 624, and state updating logic 626. The store

620 may be any suitable type of store. One type of store is a database. For instance, the store 620 may be a relational database, an entity-relationship database, an object database, an object relational database, an extensible markup language (XML) database, etc. The store 620 is shown to store an initial state 632 of the client device and an updated state 634 of the client device for non-limiting, illustrative purposes. Further structural and operational embodiments will be apparent to persons skilled in the relevant art(s) based on the discussion regarding flowcharts 300, 400, and 500.

As shown in FIG. 3, the method of flowchart 300 begins at step 302. In step 302, an initial state of the client device is stored. The initial state is defined by first records that identify respective first binaries that are associated with the client device at a first time instance. Examples of a binary include but are not limited to an executable, a job file (e.g., a Java archive (e.g., zip) file), and an Apple disk image file. A binary may be associated with the client device by being stored and/or installed on the client device. For instance, the first binaries may include all binaries stored on the client device at the first time instance. In one example, a record may be represented using integer(s) or string(s). In another example, a record may include a binary of a product with which the record is associated and/or a hash of information about the product. For instance, the information may include a vendor of the product, a name of the product, and/or a version number of the product. In an example implementation, the storage logic 622 stores an initial state 616 of the client device in the store 620. The initial state 616 is defined by the first records.

At step 304, a first event of a plurality of events is received from the client device. For example, the first event may be received from the client device via a unidirectional link. In accordance with this example, the unidirectional link may be configured to transfer information (e.g., events) from the client device to the computing system that implements the method of flowchart 300 but not from the computing system to the client device. The events include respective subsets of second records. The second records identify respective second binaries that are associated with the client device at a second time instance that temporally follows the first time instance. In an example, the second binaries may include all binaries stored on the client device at the second time instance. Each subset of the second records includes fewer than all of the second records. The second records may be respective partially ordered records. Partially ordered records are records having a partial order such that, for at least one pair of the records, a first record of the pair precedes a second record of the pair. Accordingly, each subset of the second records may be referred to as a partial order subset, and each of the events may be referred to as a partial order event. Each of the events may be a data structure or an Event Tracing for Windows (ETW) event. ETW provides a mechanism to trace and log events that are raised by user-mode applications and kernel-mode drivers.

Each of the events, except for a last event of the events, further includes a beginning record of a next sequential event of the events. A beginning record of an event begins the subset of the second records that is included in the event. For instance, the beginning record may be positioned first among the records in the subset. Each of the events may have a variable size, depending on a size of the second records that are included in the event. A last record in the last event of the events may be assigned a Unicode value of FFFF, which indicates that the second records include no further records to be incorporated into the updated state of the client device, though the example embodiments are not limited in this respect.

Configuring each of the events, except for the last event of the events, to include the beginning record of the next sequential event, may reduce an amount of time and/or resources (e.g., processor cycles, memory, network bandwidth) that is consumed to update the state of the client device by reducing a number of operations that are performed to order the subsets of the records that are included in the respective events. Configuring the events in this manner may increase efficiency of the computing system (e.g., computing system 600) that is used to update the state of the client device. For instance, configuring the events in this manner may enable the records to be processed without a delay that is associated with conventional techniques. Configuring the events in this manner may increase reliability of the process of updating the state of the client device because receipt of an index event is not required to avoid a failure to update the state of the client device.

The events are configured in accordance with the limited event size protocol. For example, a number of records in each subset of the second records is based on an event size threshold. In accordance with this example, the event size threshold is greater than a size of a single one of the second records and less than a cumulative size of the second records. For instance, the event size threshold may be a fixed event size threshold (e.g., 64 kB or 128 kB). In another example, a number of the second records that are included in each of the events, except for the last event of the events, is based on a difference between a cumulative size of the number of the second records and the event size threshold being less than a size of a next consecutive record of the second records.

The events being configured in accordance with the limited event size protocol may reduce an amount of time and/or resources (e.g., processor cycles, memory, network bandwidth) that is consumed to update the state of the client device by reducing a number of events that are processed to identify the second records. The events being configured in accordance with the limited event size protocol may increase efficiency of the computing system (e.g., computing system 600) that is used to update the state of the client device. For instance, the events being configured in this manner may enable a greater proportion of each event to be allocated to data regarding the state of the client device as opposed to metadata associated with the respective event.

In an example implementation, the storage logic 622 receives a first event of events 618 from the client device. The events 618 include the respective subsets of the second records.

At step 306, the first event is parsed to identify a first subset of the second records that is included in the first event. For example, the first event may be parsed to determine a number of the second records in the first subset, content of each second record in the first subset, an order of the second records in the first subset, and so on. In accordance with this example, parsing the first event may include determining that the first event includes more than one of the second records. In an example implementation, the parsing logic 624 parses the first event to identify the first subset of the second records that is included in the first event. The parsing logic 624 may generate record information 628 to indicate which of the second records are included in the first subset. The parsing logic 624 may generate the record information 628 to further indicate the beginning record of the next sequential event of the events that is included in the first event.

In an example embodiment, the records in the first subset are ordered in the first event. In accordance with this embodiment, parsing the first event at step 306 includes reviewing a first beginning record that begins the first subset and a second beginning record that begins the next sequential event after the first event. In further accordance with this embodiment, parsing the first event at step 306 further includes determining the records in the first subset that are between the first beginning record and the second beginning record, based on reviewing the first beginning record and the second beginning record, without reviewing the records in the first subset that are between the first beginning record and the second beginning record. Accordingly, complexity of the parsing in this embodiment may be dominated by a number of the second records in the first event.

In another example embodiment, the records in the first subset are not ordered in the first event. In accordance with this embodiment, parsing the first event includes reviewing each record in the first event to determine an order in which the records in the first subset of the second records are to be included in the updated state of the client device. Accordingly, complexity of the parsing in this embodiment may be dominated by a number of the second records that are saved on the computing system that implements the method of flowchart 300.

At step 308, an updated state of the client device is generated by replacing a first portion of the first records, which corresponds to the first subset of the second records, with the first subset of the second records. In an example implementation, the state updating logic 626 generates an updated state 630 of the client device by replacing the first portion of the first records with the first subset of the second records. For instance, the state updating logic 626 may review the record information to determine which of the second records are included in the first subset of the second records and the beginning record of the next sequential event. The state updating logic 626 may cross-reference the first subset of the second records, as indicated by the record information 628, with the first portion of the first records included in the initial state 616 to determine that the first subset of the second records is to replace the first portion of the first records. The state updating logic 626 may apply a comparison function to each of the second records in the first subset to implement a partial order as defined by the client device. For instance, if each record is implemented as an integer, the state updating logic 626 may place the second records in numerical order (e.g., 1<2<3 . . . , and 1==1 !=2, . . . ). If each record is implemented as a string (e.g., word), the state updating logic 626 may place the second records in lexicographical order (e.g., a<b<c . . . , and a==a !=b, . . . ).

In an example embodiment, replacing the first portion of the first records with the first subset of the second records is performed regardless of whether another event, other than the first event, in the events has been received from the client device.

In another example embodiment, replacing the first portion of the first records with the first subset of the second records includes not waiting to replace the first portion of the first records with the first subset of the second records until another event is received from the client device. For instance, the first portion of the first records may be replaced with the first subset of the second records in real-time as a result of the first event being received (e.g., as the first event is received).

In yet another example embodiment, generating the updated state of the client device at step 308 includes incrementally updating the state of the client device such that receipt of each of the events triggers a respective incremental update of the state of the client device (e.g., and storage of the respective incremental update by a computing system that implements the method of flowchart 300).

In some example embodiments, one or more steps 302, 304, 306, and/or 308 of flowchart 300 may not be performed. Moreover, steps in addition to or in lieu of steps 302, 304, 306, and/or 308 may be performed. For instance, in an example embodiment, the method of flowchart 300 further includes discarding the first subset of the second records based on the first event being parsed. In an example implementation, the state updating logic 622 discards the first subset of the second records based on the first event being parsed. For instance, the first subset of the second records may be discarded because each of the second records in the first subset can be regenerated (e.g., recreated) from the updated state 630 of the client device that is stored in the store 620.

In another example embodiment, the method of flowchart 300 includes one or more of the steps shown in flowchart 400 of FIG. 4. As shown in FIG. 4, the method of flowchart 400 begins at step 402. In step 402, a second event of the events is received from the client device. The first event includes the beginning record of the second event. In an example implementation, the storage logic 622 receives the second event from the client device. For instance, the second event is included in the events 618.

At step 404, the second event is parsed to identify a second subset of the second records that is included in the second event. For example, the second event may be parsed to determine a number of the second records in the second subset, content of each second record in the second subset, an order of the second records in the second subset, and so on. In an example implementation, the parsing logic 624 parses the second event to identify the second subset of the second records. The parsing logic 624 may generate record information 628 to indicate which of the second records are included in the second subset. The parsing logic 624 may generate the record information 628 to further indicate the beginning record of the next sequential event of the events that is included in the second event.

At step 406, a second portion of the first records, which corresponds to the second subset of the second records, is replaced with the second subset of the second records. In an example implementation, the state updating logic 626 replaces the second portion of the first records with the second subset of the second records.

At step 408, a determination is made that the second subset of the second records is to be consecutive with the first subset of the second records based on the first event including the beginning record of the second event. For instance, the first event including the beginning record of the second event may indicate that the second subset is to immediately follow the first subset in storage. In an example implementation, the state updating logic 626 determines that the second subset of the second records is to be consecutive with the first subset of the second records. For instance, the state updating logic 626 may analyze the record information 628 to determine that the first event includes the beginning record of the second event. Based on this determination, the state updating logic 626 may determine that the first and second subsets of the second records are to be ordered such that the second subset is stored consecutively with the first subset.

At step 410, the second subset of the second records is caused to be consecutive with the first subset of the second records in the updated state of the client device based on a determination that the second subset of the second records is to be consecutive with the first subset of the second records. In an example implementation, the state updating logic 626 causes the second subset of the second records to be consecutive with the first subset of the second records in the updated state 630 of the client device. For instance, the state updating logic 626 may store the second subset consecutively (e.g., immediately following) the first subset in the store 620.

It will be recognized that step 406 and/or step 410 may be included in step 308 of flowchart 300 in FIG. 3.

As shown in FIG. 5, the method of flowchart 500 begins at step 502. In step 502, an initial state of the client device is stored. The initial state is defined by first records that identify respective first binaries that are associated with the client device at a first time instance. In an example implementation, the storage logic 622 stores an initial state 616 of the client device in the store 620.

At step 504, an event of a plurality of events is received from the client device. For instance, the event may be received via a unidirectional link. The events include respective subsets of the second records. The second records identify respective second binaries that are associated with the client device at a second time instance that temporally follows the first time instance. The second records may be respective partially ordered records. The events are configured in accordance with the limited event size protocol. For example, a number of records in each subset of the second records may be based on an event size threshold. In accordance with this example, the event size threshold may be greater than a size of a single record of the second records and less than a cumulative size of the second records. Accordingly, at least one of the events may include more than one of the second records. In an example implementation, the storage logic 622 receives the event from the client device. In accordance with this implementation, the event is included among events 618.

In an example embodiment, a number of the second records that are included in each event of the events, except for a last event of the events, is based on a difference between a cumulative size of the number of the second records and the event size threshold being less than a size of a next consecutive record of the second records.

At step 506, the event is parsed to identify the respective subset of the second records that is included in the event. In an example implementation, the parsing logic 624 parses the event to identify the respective subset of the second records therein. The parsing logic 624 may generate record information 628 to indicate which of the second records are included in the subset.

At step 508, an incremental update of the state of the client device is triggered without regard to whether another event of the events has been received from the client device. Triggering the incremental update at step 508 comprises replacing a respective portion of the first records, which corresponds to the respective subset of the second records, with the respective subset of the second records. In an example implementation, the state updating logic 626 triggers the incremental update of the state of the client device without regard to whether another event of the events has been received from the client device. In accordance with this implementation, the state updating logic 626 triggers the incremental update by replacing the respective portion of the first records, which corresponds to the respective subset of the second records, with the respective subset of the second records in the store 620. Accordingly, the state updating logic 626 may generate or update the updated state 630 in the store 620 by replacing the respective portion of the first records with the respective subset of the second records.

Triggering the incremental update of the state of the client device at 508, rather than delaying an update of the state until an index event is received, may reduce an amount of time that is consumed to update the state of the client device and/or increase efficiency of the computing system (e.g., computing system 600) that is used to update the state of the client device (e.g., by avoiding the delay mentioned above).

In an example embodiment, triggering the incremental update of the state of the client device at step 508 is performed regardless of whether another event, other than the event that includes the respective subset of the second records, in the events has been received from the client device.

In another example embodiment, triggering the incremental update of the state of the client device at step 508 includes not waiting to replace each portion of the first records with the respective subset of the second records until another event, other than the event that includes the respective subset of the second records, is received from the client device.

In yet another example embodiment, triggering the incremental update of the state of the client device at step 508 includes discarding the respective subset of the second records based on the respective event being parsed.

At step 510, a determination is made whether the events include an event that has not yet been received. If the events include an event that has not yet been received, flow continues to step 512. Otherwise, flowchart 200 ends. In an example implementation, the parsing logic 624 determines whether the events include any events that have not yet been received. For instance, if each event of the events, except for the last event of the events, includes a beginning record of the next sequential event of the events, the parsing logic 624 may determine whether any of the aforementioned next sequential events has not been received. For example, if any received event includes the beginning record of another event that has not yet been received, the parsing logic 624 may conclude that the events include an event that has not yet been received. In another example, if each of the events having a beginning record that is included in another event has been received, the parsing logic 624 may conclude that the events do not include an event that has not yet been received.

At step 512, the event is received. Upon completion of step 512, flow returns to step 506. In an example implementation, the storage logic 622 receives the event.

In an example embodiment, at least one of the events includes a respective subset of the second records in which the records are ordered. In accordance with this embodiment, parsing the respective event at step 506 includes reviewing a first beginning record that begins the respective subset and a second beginning record that begins the next sequential event after the respective event. In further accordance with this embodiment, parsing the respective event at step 506 includes determining the records in the respective subset that are between the first beginning record and the second beginning record, based on reviewing the first beginning record and the second beginning record, without reviewing the records in the respective subset that are between the first beginning record and the second beginning record.

In another example embodiment, at least one of the events includes a respective subset of the second records in which the records are not ordered. In accordance with this embodiment, parsing the respective event at step 506 includes reviewing each record in the respective event to determine an order in which the records in the respective subset of the second records are to be included in an incremental update of the state of the client device.

In some example embodiments, one or more steps 502, 504, 506, 508, 510, and/or 512 of flowchart 500 may not be performed. Moreover, steps in addition to or in lieu of steps 502, 504, 506, 508, 510, and/or 512 may be performed.

It will be recognized that the computing system 600 may not include one or more of the limited event size updating logic 608, the store 620, the storage logic 622, the parsing logic 624, and/or the state updating logic 626. Furthermore, the computing system 600 may include components in addition to or in lieu of the limited event size updating logic 608, the store 620, the storage logic 622, the parsing logic 624, and/or the state updating logic 626.

Although the operations of some of the disclosed methods are described in a particular, sequential order for convenient presentation, it should be understood that this manner of description encompasses rearrangement, unless a particular ordering is required by specific language set forth herein. For example, operations described sequentially may in some cases be rearranged or performed concurrently. Moreover, for the sake of simplicity, the attached figures may not show the various ways in which the disclosed methods may be used in conjunction with other methods.

Any one or more of the limited event size updating logic 108, the limited event size updating logic 608, the storage logic 622, the parsing logic 624, the state updating logic 626, flowchart 300, flowchart 400, and/or flowchart 500 may be implemented in hardware, software, firmware, or any combination thereof.

For example, any one or more of the limited event size updating logic 108, the limited event size updating logic 608, the storage logic 622, the parsing logic 624, the state updating logic 626, flowchart 300, flowchart 400, and/or flowchart 500 may be implemented, at least in part, as computer program code configured to be executed in one or more processors.

In another example, any one or more of the limited event size updating logic 108, the limited event size updating logic 608, the storage logic 622, the parsing logic 624, the state updating logic 626, flowchart 300, flowchart 400, and/or flowchart 500 may be implemented, at least in part, as hardware logic/electrical circuitry. Such hardware logic/electrical circuitry may include one or more hardware logic components. Examples of a hardware logic component include but are not limited to a field-programmable gate array (FPGA), an application-specific integrated circuit (ASIC), an application-specific standard product (ASSP), a system-on-a-chip system (SoC), a complex programmable logic device (CPLD), etc. For instance, a SoC may include an integrated circuit chip that includes one or more of a processor (e.g., a microcontroller, microprocessor, digital signal processor (DSP), etc.), memory, one or more communication interfaces, and/or further circuits and/or embedded firmware to perform its functions.

Figure 7:
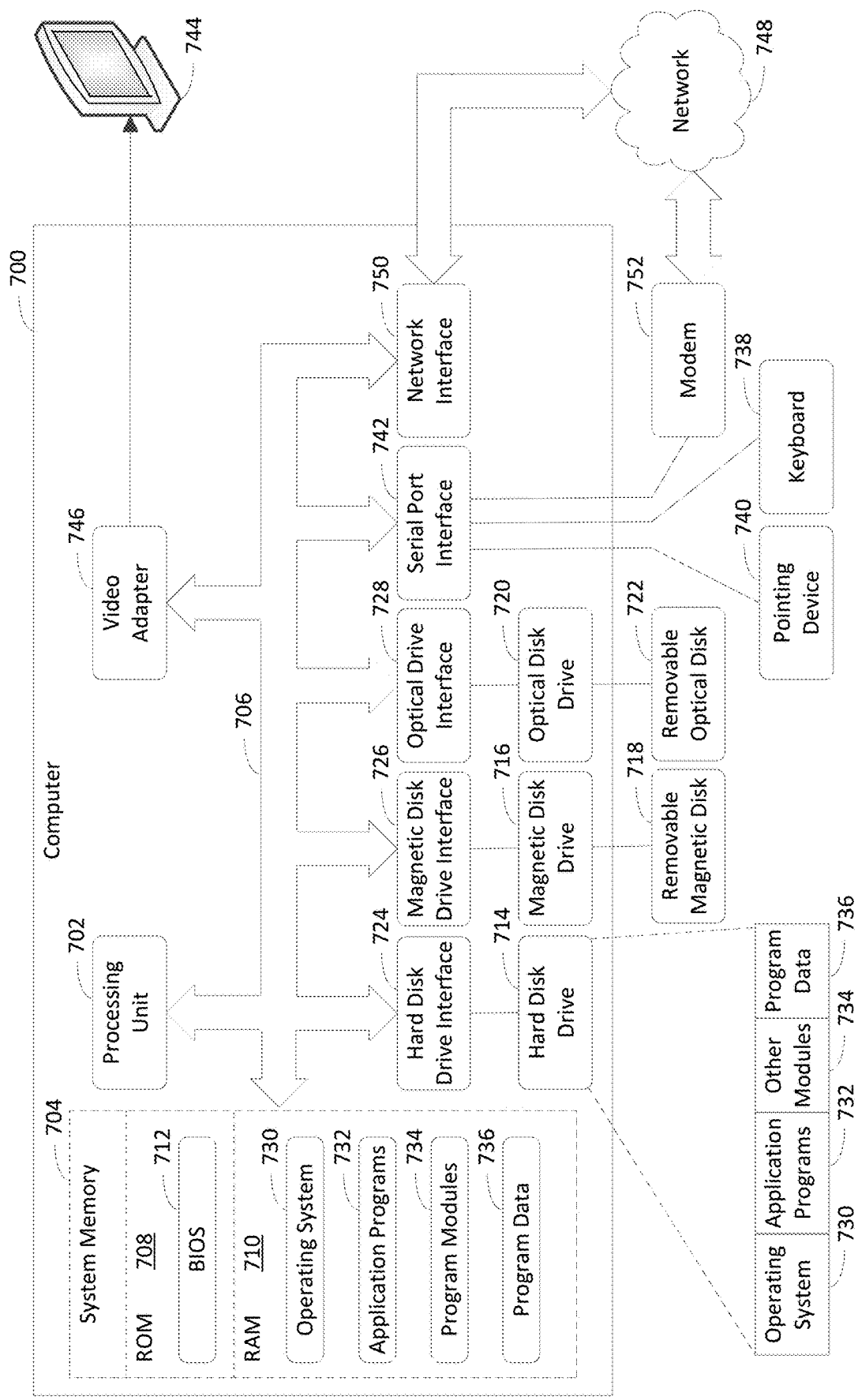
FIG. 7 depicts an example computer in which embodiments may be implemented.

III. Further Discussion of Some Example Embodiments (A1) An example system (FIG. 1, 106A-106N; FIG. 2, 206; FIG. 6, 600; FIG. 7, 700) to update a state of a client device (FIG. 1, 102A-102M) using a limited event size protocol comprises a memory (FIG. 7, 704, 708, 710) and a processing system (FIG. 7, 702) coupled to the memory. The processing system is configured to store (FIG. 3, 302) an initial state (FIG. 6, 616) of the client device in the memory. The initial state is defined by a first plurality of records that identify a first plurality of respective binaries that are associated with the client device at a first time instance. The processing system is further configured to receive (FIG. 3, 304) a first event of a plurality of events (FIG. 6, 618) from the client device. Each event of the plurality of events, except for a last event of the plurality of events, includes a respective subset of a second plurality of records and a beginning record of a next sequential event of the plurality of events. The last event of the plurality of events includes a respective subset of the second plurality of records. The second plurality of records identifies a second plurality of respective binaries that are associated with the client device at a second time instance that temporally follows the first time instance. A number of records in each subset of the second plurality of records is based on an event size threshold. The event size threshold is greater than a size of a single record of the second plurality of records and less than a cumulative size of the second plurality of records. The processing system is further configured to parse (FIG. 3, 306) the first event to identify a first subset of the second plurality of records that is included in the first event. The processing system is further configured to generate (FIG. 3, 308) an updated state (FIG. 6, 630) of the client device by replacing a first portion of the first plurality of records, which corresponds to the first subset of the second plurality of records, with the first subset of the second plurality of records in the memory.

(A2) In the example system of A1, wherein the processing system is configured to receive the first event from the client device via a unidirectional link.

(A3) In the example system of any of A1-A2, wherein the processing system is configured to parse the first event to determine that the first subset of the second plurality of records includes more than one record of the second plurality of records.

(A4) In the example system of any of A1-A3, wherein the records in the first subset are ordered in the first event; and wherein the processing system is configured to parse the first event by performing the following operations: review a first beginning record that begins the first subset and a second beginning record that begins the next sequential event after the first event; and determine the records in the first subset that are between the first beginning record and the second beginning record, based on reviewing the first beginning record and the second beginning record, without reviewing the records in the first subset that are between the first beginning record and the second beginning record.

(A5) In the example system of any of A1-A4, wherein the records in the first subset are not ordered in the first event; and wherein the processing system is configured to: parse the first event by reviewing each record in the first event to determine an order in which the records in the first subset of the second plurality of records are to be included in the updated state of the client device.

(A6) In the example system of any of A1-A5, wherein the processing system is configured to generate the updated state of the client device by replacing the first portion of the first plurality of records with the first subset of the second plurality of records regardless of whether another event, other than the first event, in the plurality of events has been received from the client device.

(A7) In the example system of any of A1-A6, wherein the processing system is configured to not wait to replace the first portion of the first plurality of records with the first subset of the second plurality of records until another event is received from the client device.

(A8) In the example system of any of A1-A7, wherein a number of the second plurality of records that are included in each event of the plurality of events, except for the last event of the plurality of events, is based on a difference between a cumulative size of the number of the second plurality of records and the event size threshold being less than a size of a next consecutive record of the second plurality of records.

(A9) In the example system of any of A1-A8, wherein the processing system is configured to: receive a second event of the plurality of events from the client device, wherein the first event includes the beginning record of the second event; parse the second event to identify a second subset of the second plurality of records that is included in the second event; and generate the updated state of the client device further by replacing a second portion of the first plurality of records, which corresponds to the second subset of the second plurality of records, with the second subset of the second plurality of records.

(A10) In the example system of any of A1-A9, wherein the processing system is configured to: determine that the second subset of the second plurality of records is to be consecutive with the first subset of the second plurality of records based on the first event including the beginning record of the second event; and generate the updated state of the client device further by causing the second subset of the second plurality of records to be consecutive with the first subset of the second plurality of records in the updated state of the client device based on a determination that the second subset of the second plurality of records is to be consecutive with the first subset of the second plurality of records.

(A11) In the example system of any of A1-A10, wherein the processing system is further configured to: discard the first subset of the second plurality of records based on the first event being parsed.

(B1) An example method of incrementally updating a state of a client device (FIG. 1, 102A-102M) using a limited event size protocol. The method is implemented by a computing system (FIG. 1, 106A-106N; FIG. 2, 206; FIG. 6, 600; FIG. 7, 700) that is coupled to the client device. The method comprises storing (FIG. 5, 502) an initial state (FIG. 6, 616) of the client device. The initial state is defined by a first plurality of records that identify a first plurality of respective binaries that are associated with the client device at a first time instance. The method further comprises receiving (FIG. 5, 504) a plurality of events (FIG. 6, 618) from the client device at a plurality of respective time instances. The plurality of events include respective subsets of the second plurality of records. The second plurality of records identifies a second plurality of respective binaries that are associated with the client device at a second time instance that temporally follows the first time instance. A number of records in each subset of the second plurality of records is based on an event size threshold. The event size threshold is greater than a size of a single record of the second plurality of records and less than a cumulative size of the second plurality of records. The method further comprises, based on receipt of each of the plurality of events, performing the following: parsing (FIG. 5, 506) the respective event to identify the respective subset of the second plurality of records that is included in the respective event; and triggering (FIG. 5, 508) a respective incremental update of the state of the client device without regard to whether another event of the plurality of events has been received from the client device. The triggering comprises replacing a respective portion of the first plurality of records, which corresponds to the respective subset of the second plurality of records, with the respective subset of the second plurality of records.

(B2) In the method of B1, wherein receiving the plurality of events comprises receiving the plurality of events from the client device via a unidirectional link.

(B3) In the method of any of B1-B2, wherein at least one of the plurality of events includes more than one record of the second plurality of records.

(B4) In the method of any of B1-B3, wherein a first event of the plurality of events includes a first subset of the second plurality of records in which the records are ordered; and wherein the method comprises: reviewing a first beginning record that begins the first subset and a second beginning record that begins the next sequential event after the first event; and determining the records in the first subset that are between the first beginning record and the second beginning record, based on reviewing the first beginning record and the second beginning record, without reviewing the records in the first subset that are between the first beginning record and the second beginning record.

(B5) In the method of any of B1-B4, wherein each portion of the first plurality of records is replaced with the respective subset of the second plurality of records regardless of whether another event, other than the event that includes the respective subset of the second plurality of records, in the plurality of events has been received from the client device.

(B6) In the method of any of B1-B5, comprising not waiting to replace each portion of the first plurality of records with the respective subset of the second plurality of records until another event, other than the event that includes the respective subset of the second plurality of records, is received from the client device.

(B7) In the method of any of B1-B6, wherein a number of the second plurality of records that are included in each event of the plurality of events, except for a last event of the plurality of events, is based on a difference between a cumulative size of the number of the second plurality of records and the event size threshold being less than a size of a next consecutive record of the second plurality of records.

(B8) In the method of any of B1-B7, further comprising discarding each subset of the second plurality of records based on the respective event being parsed.

(C1) An example computer program product (FIG. 7, 718, 722) comprising a computer-readable storage medium having instructions recorded thereon for enabling a processor-based system (FIG. 1, 106A-106N; FIG. 2, 206; FIG. 6, 600; FIG. 7, 700) to update a state of a client device (FIG. 1, 102A-102M) using a limited event size protocol by performing operations. The operations comprise storing (FIG. 3, 302) an initial state (FIG. 6, 616) of the client device. The initial state is defined by a first plurality of records that identify a first plurality of respective binaries that are associated with the client device at a first time instance. The operations further comprise receiving (FIG. 3, 304) a first event of a plurality of events (FIG. 6, 618) from the client device. Each event of the plurality of events, except for a last event of the plurality of events, includes a respective subset of a second plurality of records and a beginning record of a next sequential event of the plurality of events. The last event of the plurality of events includes a respective subset of the second plurality of records. The second plurality of records identifies a second plurality of respective binaries that are associated with the client device at a second time instance that temporally follows the first time instance. A number of records in each subset of the second plurality of records is based on an event size threshold. The event size threshold is greater than a size of a single record of the second plurality of records and less than a cumulative size of the second plurality of records. The operations further comprise parsing (FIG. 3, 306) the first event to identify a first subset of the second plurality of records that is included in the first event. The operations further comprise generating (FIG. 3, 308) an updated state (FIG. 6, 630) of the client device by replacing a first portion of the first plurality of records, which corresponds to the first subset of the second plurality of records, with the first subset of the second plurality of records.

IV. Example Computer System

FIG. 7 depicts an example computer 700 in which embodiments may be implemented. Any one or more of the client devices 102A-102M and/or any one or more of the servers 106A-106N shown in FIG. 1; the client device 202 and/or the server 206 shown in FIG. 2; and/or computing system 600 shown in FIG. 6 may be implemented using computer 700, including one or more features of computer 700 and/or alternative features. Computer 700 may be a general-purpose computing device in the form of a conventional personal computer, a mobile computer, or a workstation, for example, or computer 700 may be a special purpose computing device. The description of computer 700 provided herein is provided for purposes of illustration, and is not intended to be limiting. Embodiments may be implemented in further types of computer systems, as would be known to persons skilled in the relevant art(s).

As shown in FIG. 7, computer 700 includes a processing unit 702, a system memory 704, and a bus 706 that couples various system components including system memory 704 to processing unit 702. Bus 706 represents one or more of any of several types of bus structures, including a memory bus or memory controller, a peripheral bus, an accelerated graphics port, and a processor or local bus using any of a variety of bus architectures. System memory 704 includes read only memory (ROM) 708 and random access memory (RAM) 710. A basic input/output system 712 (BIOS) is stored in ROM 708.

Computer 700 also has one or more of the following drives: a hard disk drive 714 for reading from and writing to a hard disk, a magnetic disk drive 716 for reading from or writing to a removable magnetic disk 718, and an optical disk drive 720 for reading from or writing to a removable optical disk 722 such as a CD ROM, DVD ROM, or other optical media. Hard disk drive 714, magnetic disk drive 716, and optical disk drive 720 are connected to bus 706 by a hard disk drive interface 724, a magnetic disk drive interface 726, and an optical drive interface 728, respectively. The drives and their associated computer-readable storage media provide nonvolatile storage of computer-readable instructions, data structures, program modules and other data for the computer. Although a hard disk, a removable magnetic disk and a removable optical disk are described, other types of computer-readable storage media can be used to store data, such as flash memory cards, digital video disks, random access memories (RAMs), read only memories (ROM), and the like.

A number of program modules may be stored on the hard disk, magnetic disk, optical disk, ROM, or RAM. These programs include an operating system 730, one or more application programs 732, other program modules 734, and program data 736. Application programs 732 or program modules 734 may include, for example, computer program logic for implementing any one or more of (e.g., at least a portion of) the limited event size updating logic 108, the limited event size updating logic 608, the storage logic 622, the parsing logic 624, the state updating logic 626, flowchart 300 (including any step of flowchart 300), flowchart 400 (including any step of flowchart 400), and/or flowchart 500 (including any step of flowchart 500), as described herein.

A user may enter commands and information into the computer 700 through input devices such as keyboard 738 and pointing device 740. Other input devices (not shown) may include a microphone, joystick, game pad, satellite dish, scanner, touch screen, camera, accelerometer, gyroscope, or the like. These and other input devices are often connected to the processing unit 702 through a serial port interface 742 that is coupled to bus 706, but may be connected by other interfaces, such as a parallel port, game port, or a universal serial bus (USB).

A display device 744 (e.g., a monitor) is also connected to bus 706 via an interface, such as a video adapter 746. In addition to display device 744, computer 700 may include other peripheral output devices (not shown) such as speakers and printers.

Computer 700 is connected to a network 748 (e.g., the Internet) through a network interface or adapter 750, a modem 752, or other means for establishing communications over the network. Modem 752, which may be internal or external, is connected to bus 706 via serial port interface 742.

As used herein, the terms "computer program medium" and "computer-readable storage medium" are used to generally refer to media (e.g., non-transitory media) such as the hard disk associated with hard disk drive 714, removable magnetic disk 718, removable optical disk 722, as well as other media such as flash memory cards, digital video disks, random access memories (RAMs), read only memories (ROM), and the like. A computer-readable storage medium is not a signal, such as a carrier signal or a propagating signal. For instance, a computer-readable storage medium may not include a signal. Accordingly, a computer-readable storage medium does not constitute a signal per se. Such computer-readable storage media are distinguished from and non-overlapping with communication media (do not include communication media). Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media. Example embodiments are also directed to such communication media.

As noted above, computer programs and modules (including application programs 732 and other program modules 734) may be stored on the hard disk, magnetic disk, optical disk, ROM, or RAM. Such computer programs may also be received via network interface 750 or serial port interface 742. Such computer programs, when executed or loaded by an application, enable computer 700 to implement features of embodiments discussed herein. Accordingly, such computer programs represent controllers of the computer 700.

Example embodiments are also directed to computer program products comprising software (e.g., computer-readable instructions) stored on any computer-useable medium. Such software, when executed in one or more data processing devices, causes data processing device(s) to operate as described herein. Embodiments may employ any computer-useable or computer-readable medium, known now or in the future. Examples of computer-readable mediums include, but are not limited to storage devices such as RAM, hard drives, floppy disks, CD ROMs, DVD ROMs, zip disks, tapes, magnetic storage devices, optical storage devices, MEMS-based storage devices, nanotechnology-based storage devices, and the like.

It will be recognized that the disclosed technologies are not limited to any particular computer or type of hardware. Certain details of suitable computers and hardware are well known and need not be set forth in detail in this disclosure.

V. Conclusion

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims, and other equivalent features and acts are intended to be within the scope of the claims.

What is claimed is:

1. A system to update a state of a client device using a limited event size protocol, the system comprising:
    a memory; and
    a processing system coupled to the memory, the processing system configured to:
        store an initial state of the client device in the memory, the initial state defined by a first plurality of records that identify a first plurality of respective binaries that are associated with the client device at a first time instance;
        receive a first event of a plurality of events from the client device,
            each event of the plurality of events, except for a last event of the plurality of events, including a respective subset of a second plurality of records and a beginning record of a next sequential event of the plurality of events,
            the last event of the plurality of events including a respective subset of the second plurality of records,
            the second plurality of records identifying a second plurality of respective binaries that are associated with the client device at a second time instance that temporally follows the first time instance,
            a number of records in each subset of the second plurality of records based on an event size threshold,
            the event size threshold being greater than a size of a single record of the second plurality of records and less than a cumulative size of the second plurality of records;
        parse the first event to identify a first subset of the second plurality of records that is included in the first event; and
        generate an updated state of the client device by replacing a first portion of the first plurality of records, which corresponds to the first subset of the second plurality of records, with the first subset of the second plurality of records in the memory.

2. The system of claim 1, wherein the processing system is configured to:
    receive the first event from the client device via a unidirectional link.

3. The system of claim 1, wherein the processing system is configured to:
    parse the first event to determine that the first subset of the second plurality of records includes more than one record of the second plurality of records.

4. The system of claim 1, wherein the records in the first subset are ordered in the first event; and
    wherein the processing system is configured to parse the first event by performing the following operations:
        review a first beginning record that begins the first subset and a second beginning record that begins the next sequential event after the first event; and
        determine the records in the first subset that are between the first beginning record and the second beginning record, based on reviewing the first beginning record and the second beginning record, without reviewing the records in the first subset that are between the first beginning record and the second beginning record.

5. The system of claim 1, wherein the records in the first subset are not ordered in the first event; and
    wherein the processing system is configured to:
        parse the first event by reviewing each record in the first event to determine an order in which the records in the first subset of the second plurality of records are to be included in the updated state of the client device.

6. The system of claim 1, wherein the processing system is configured to:
    generate the updated state of the client device by replacing the first portion of the first plurality of records with the first subset of the second plurality of records regardless of whether another event, other than the first event, in the plurality of events has been received from the client device.

7. The system of claim 1, wherein the processing system is configured to:
    not wait to replace the first portion of the first plurality of records with the first subset of the second plurality of records until another event is received from the client device.

8. The system of claim 1, wherein a number of the second plurality of records that are included in each event of the plurality of events, except for the last event of the plurality of events, is based on a difference between a cumulative size of the number of the second plurality of records and the event size threshold being less than a size of a next consecutive record of the second plurality of records.

9. The system of claim 1, wherein the processing system is configured to:
    receive a second event of the plurality of events from the client device, wherein the first event includes the beginning record of the second event;
    parse the second event to identify a second subset of the second plurality of records that is included in the second event; and
    generate the updated state of the client device further by replacing a second portion of the first plurality of records, which corresponds to the second subset of the second plurality of records, with the second subset of the second plurality of records.

10. The system of claim 9, wherein the processing system is configured to:
    determine that the second subset of the second plurality of records is to be consecutive with the first subset of the second plurality of records based on the first event including the beginning record of the second event; and
generate the updated state of the client device further by causing the second subset of the second plurality of records to be consecutive with the first subset of the second plurality of records in the updated state of the client device based on a determination that the second subset of the second plurality of records is to be consecutive with the first subset of the second plurality of records.

11. The system of claim 1, wherein the processing system is further configured to:
discard the first subset of the second plurality of records based on the first event being parsed.

12. A method of incrementally updating a state of a client device using a limited event size protocol, the method implemented by a computing system that is coupled to the client device, the method comprising:
storing an initial state of the client device,
the initial state defined by a first plurality of records that identify a first plurality of respective binaries that are associated with the client device at a first time instance;
receiving a plurality of events from the client device at a plurality of respective time instances,
the plurality of events including respective subsets of a second plurality of records,
the second plurality of records identifying a second plurality of respective binaries that are associated with the client device at a second time instance that temporally follows the first time instance,
a number of records in each subset of the second plurality of records based on an event size threshold,
the event size threshold being greater than a size of a single record of the second plurality of records and less than a cumulative size of the second plurality of records; and
based on receipt of each of the plurality of events, performing the following:
parsing the respective event to identify the respective subset of the second plurality of records that is included in the respective event; and
triggering a respective incremental update of the state of the client device without regard to whether another event of the plurality of events has been received from the client device, the triggering comprising:
replacing a respective portion of the first plurality of records, which corresponds to the respective subset of the second plurality of records, with the respective subset of the second plurality of records.

13. The method of claim 12, wherein receiving the plurality of events comprises:
receiving the plurality of events from the client device via a unidirectional link.

14. The method of claim 12, wherein at least one of the plurality of events includes more than one record of the second plurality of records.

15. The method of claim 12, wherein a first event of the plurality of events includes a first subset of the second plurality of records in which the records are ordered; and
wherein the method comprises:
reviewing a first beginning record that begins the first subset and a second beginning record that begins the next sequential event after the first event; and
determining the records in the first subset that are between the first beginning record and the second beginning record, based on reviewing the first beginning record and the second beginning record, without reviewing the records in the first subset that are between the first beginning record and the second beginning record.

16. The method of claim 12, wherein each portion of the first plurality of records is replaced with the respective subset of the second plurality of records regardless of whether another event, other than the event that includes the respective subset of the second plurality of records, in the plurality of events has been received from the client device.

17. The method of claim 12, comprising:
not waiting to replace each portion of the first plurality of records with the respective subset of the second plurality of records until another event, other than the event that includes the respective subset of the second plurality of records, is received from the client device.

18. The method of claim 12, wherein a number of the second plurality of records that are included in each event of the plurality of events, except for a last event of the plurality of events, is based on a difference between a cumulative size of the number of the second plurality of records and the event size threshold being less than a size of a next consecutive record of the second plurality of records.

19. The method of claim 12, further comprising:
discarding each subset of the second plurality of records based on the respective event being parsed.

20. A computer program product comprising a computer-readable storage medium having instructions recorded thereon for enabling a processor-based system to update a state of a client device using a limited event size protocol by performing operations, the operations comprising:
storing an initial state of the client device,
the initial state defined by a first plurality of records that identify a first plurality of respective binaries that are associated with the client device at a first time instance;
receiving a first event of a plurality of events from the client device,
each event of the plurality of events, except for a last event of the plurality of events, including a respective subset of a second plurality of records and a beginning record of a next sequential event of the plurality of events,
the last event of the plurality of events including a respective subset of the second plurality of records,
the second plurality of records identifying a second plurality of respective binaries that are associated with the client device at a second time instance that temporally follows the first time instance,
a number of records in each subset of the second plurality of records based on an event size threshold,
the event size threshold being greater than a size of a single record of the second plurality of records and less than a cumulative size of the second plurality of records;
parsing the first event to identify a first subset of the second plurality of records that is included in the first event; and
generating an updated state of the client device by replacing a first portion of the first plurality of records, which corresponds to the first subset of the second plurality of records, with the first subset of the second plurality of records.

* * * * *